Dec. 30, 1952     S. GREENING     2,623,331
DIAPHRAGM TYPE OF PRESSURE REGULATORS
Filed Aug. 1, 1950
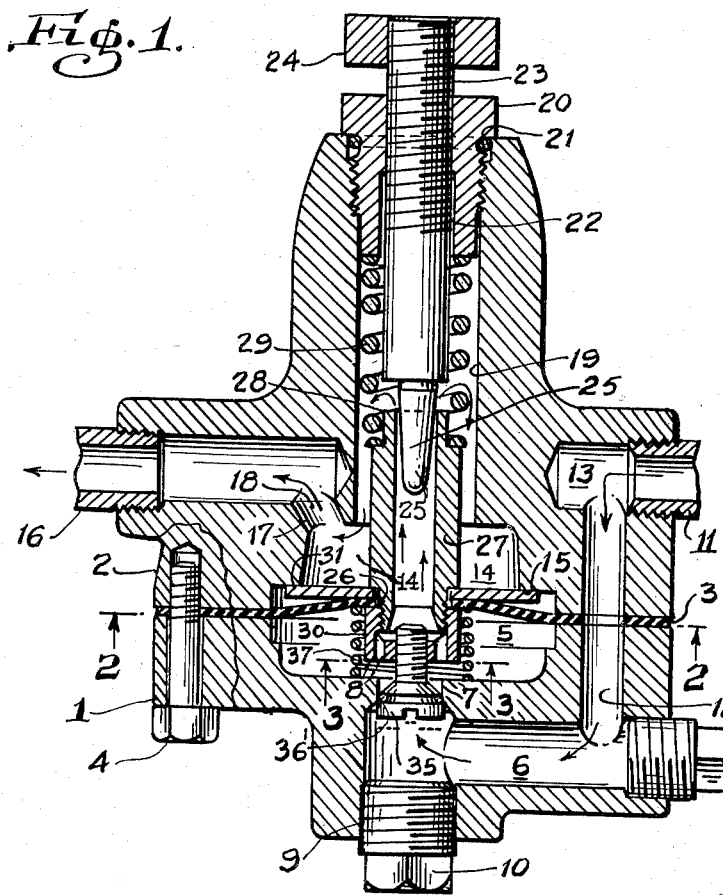
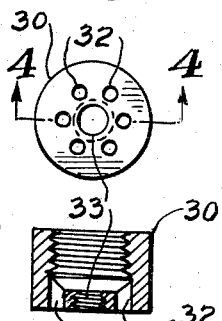
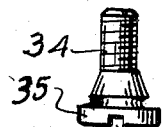
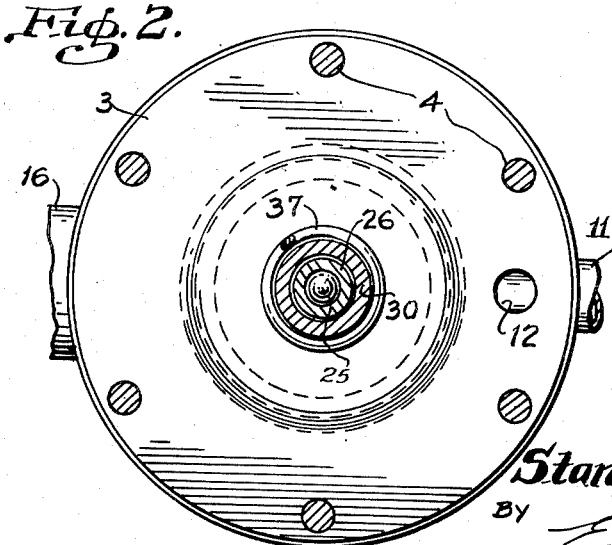
INVENTOR.
*Standlee Greening*
BY
*Earl E Moore*
ATTORNEY.

Patented Dec. 30, 1952

2,623,331

UNITED STATES PATENT OFFICE 2,623,331

DIAPHRAGM TYPE OF PRESSURE REGULATORS

Standlee Greening, Norwalk, Calif., assignor to Agro Phosphate Company, a corporation of California Application August 1, 1950, Serial No. 176,990

2 Claims. (Cl. 50—14)

1

This invention belongs to that general class of devices known as regulators and relates particularly to valves for the control of fluid pressures from sources of varying pressures and it is especially useful in the control of liquid fertilizers from a storage tank which is to be fed into irrigation ditches on fruit and vegetable lands. The vat or tank which feeds the liquid to the valve is not vented to prevent the building of high pressures therein, but is provided with a check valve to prevent vacuum conditions within the tank.

Due to temperature differentials, high pressures may exist in a tank which is exposed to general weather conditions, thus the present valve has been created to control the outlet flow pressure of the fertilizer liquids and to provide some cooling for the liquid so as to retain entrained ammonia. Although ammoniated ammonia nitrate is the fertilizer preferred, that is, the fertilizer that will usually be employed with this type of valve, it should be obvious that any fluid, charged or uncharged, can be regulated to advantage by the control device of this invention.

The invention has among its objects the production of a means of the kind described that is simple, durable and compact in structure, relatively inexpensive to make and manufacture; always dependable and efficient in use and in service, and convenient to set for pressure regulation within certain predetermined limits with no loss of volatile constituents.

Other objects, advantages and features of this particular illustrated invention will appear from a careful perusal of the accompanying drawings, the subjoined detailed description, the preamble of these specifications, and the claims appended hereto which point out the novel features thereof.

Below, applicant describes one of the preferable forms of his invention in order to teach the art thereof and show how to make and use the same, but it is to be understood that the drawings and description thereof are not to limit the invention in any sense whatsoever except as the same may be definitely limited by the teachings of the prior art. Language employed herein is not to be construed as giving any unauthorized person or organization the right to make, use and/or sell the invention herein disclosed.

In the drawings:

Figure 1 is a vertical sectional view through one of the possible valve constructions in accordance to this invention;

Figure 2 is a horizontal sectional view taken substantially along the line 2—2 of Figure 1;

2

Figure 3 is a plan view of a detail taken along line 3—3 of Figure 1;

Figure 4 is a sectional view taken substantially along the line 4—4 of Figure 3;

Figure 5 is an elevational view of a screw valve.

The particular illustrated form of the invention was designed to be set for regulating pressures from atmospheric to about two or three atmospheres and to be supported in any suitable manner to a tank at the outlet port thereof. The valve has a bottom casing 1 and a top casing 2, their tops and bottoms, respectively, providing a suitable seat and/or clamp to accommodate and hold the diaphragm 3 when the bolts 4 are secured in place, as shown. The diaphragm may be of any suitable material such as rubber, special composite flexible materials, flexible ribbed metals etc.

The bottom casing has the chamber 5 where the liquid has a slight drop in pressure so as to be self-cooling, and which chamber communicates with a bottom passage 6 by means of the throat 7 which has a lower margin that provides a valve seat and the walls thereof which form another valve seat. The threaded opening 9 is provided which is normally closed by the threaded plug 10. A threaded bore in the top casing accommodates one end of a pipe or conduit 11 which leads from the source of liquid to be dispensed and which in this case is a tank filled with liquid fertilizer such as, for instance, ammoniated ammonia nitrate. The port 13 is opening to the vertical passage 12 which communicates with the bottom passage 6.

The top casing 2 has the chamber 14 which has the peripheral stop margin 15, this chamber 14 communicating with the outlet conduit or hose 16 via the passages 17 and 18, as shown. A vertical passage 19 extends upwardly from the chamber 14 and is closed by the sleeve-plug 20 which has the neoprene sealer 21, which may be any suitable ring. The sleeve-plug has a threaded bore 22 into which is a threaded stem 23 having the keyed cap 24. This cap is knurled so that the stem can be easily adjusted by hand. The lower end of this stem has the integral and long tapered regulator element or finger 25.

The central portion of the diaphragm has an opening to accommodate the threaded portion 26 of the reduced end of a tubular element 27, the bore of which surrounds the tapered finger 25 so that vertical movement of the element 27 varies the area of passage about the finger. When the pressure below the diaphragm is great enough, this passage about the finger is closed entirely providing screw 35 is backed sufficiently. The top end of this element 27 has the reduced portion 28 which provides a shoulder to receive the bottom end of the compression spring 29; this spring being held in position by the said shoulder and the bottom surface of the sleeve-plug 20, as shown. The long taper on the valve 25 allows for adjustment variations and greater movement of the tubular element 27. This type of construction works best with liquid materials having solids therein, therefore, means must be provided to avoid stoppages due to the solids clogging the passage ways. The screw 35 must be backed downwardly sufficient to allow the valve 25 to close and the adjustment of screw 35 may be such as to allow both valves to close together when the pressure is very high under the diaphragm.

A threaded cap 30 clamps the marginal portion about the central opening of the diaphragm 3 against a large washer 31 and this washer moves with the diaphragm upon pressure differentials. A plurality of holes or passages 32 are provided in the cap. This cap is provided with a threaded bore 33 which has threaded thereinto the threaded stem 34 of a screw type valve head 35 which has a screwdriver slot 36 which enables a workman to make adjustments with a screwdriver after the plug 10 is removed. An annular groove is provided in the screwhead 35 which accommodates a neoprene sealer-ring 36' which contacts the bottom portion of the throat 7 when closed. In order to provide accurate measurement, a coiled compression spring 37 is employed which holds the weight of the structure thereabove and counterbalances the effect of the heavier spring 29.

It should now be apparent that the stem 23 can be set to provide the desired opening between the tapered element 25 and the movable tube 27 so as to allow a predetermined flow of fluid to the hose 16. In the event the pressure of the liquid from the source is greater than the pressure within the variable limits allowed, the limits in chamber 5 being determined by the setting of the screw-valve 35, the sealer O ring 36' is forced upwardly against the valve seat 8 which closes the throat 7. When the pressure drops in the chamber 5 (including throat 7) the diaphragm and spring 29 opens the throat by forcing the screwhead 35 downwardly in order to allow more liquid to enter chamber 5 and pass to the outlet 18. Any reduction of pressure upon the liquid in chamber 5 causes the liquid to cool and thus retain the volatile matter in the fertilizer. Therefore, this valve device not only regulates the pressure of liquid passing therethrough, but also cools it slightly to compensate for pressure difference and hence avoids evaporation and loss of valuable constituents.

Various changes and modifications may be made in form, style, design, and construction of the whole or any part of the specifically described embodiment of this invention without departing from the spirit thereof. Such changes and modifications are considered as being within the scope of the following claims.

I claim:

1. In a valve device for fluids, the device having a bottom casing joined to a top casing with a diaphragm member therebetween, a chamber in the top casing above the diaphragm and another chamber in the bottom casing below the diaphragm, duct means for conducting fluid from the exterior of the casings to one of the chambers and duct means for conducting fluid from the other chamber to the exterior of the casings, a central opening through the diaphragm, floating structural means including a perforated screw cap supported by the diaphragm and which structural means conducts fluid through the central opening, spring means pressing the floating means downwardly and other spring means pressing the floating means upwardly, stop means to limit the upwardly movement of the diaphragm, an adjustable flow control means at the top of the floating means and a headed screw type adjustable valve at the lower end of the floating means for shutting off and for regulating the flow of fluid to the means for conducting fluid to the exterior of the casings.

2. In a valve device having a bottom casing with a top flat surface and a top casing with a bottom flat surface, a flexible diaphragm between the surfaces which are joined together by bolts, a chamber in the top casing just above the diaphragm and a chamber in the bottom casing just below the diaphragm, means from each chamber connecting it to independent conduits from without the casings, a central opening through the diaphragm, tubular means supported by the diaphragm and passing through the central opening thereof, a washer just over the diaphragm and connected to the tubular means, a perforated cap fixed to the end of the tubular means and snugly holding the diaphragm to the washer, a valve seat at the bottom of the chamber in the bottom casing, and an adjustable valve head depending from the cap adapted to contact the valve seat when the diaphragm is in a raised position, a flow regulator at the top of the tubular means, and spring balancing means at each end of the tubular means which maintain the diaphragm in its lowered position when there is relatively low pressure below the diaphragm, and a removable plug at the bottom of the bottom casing for access to the adjustable valve head which depends from the cap.

STANDLEE GREENING.

REFERENCES CITED

The following references are of record in the file of this patent:

UNITED STATES PATENTS

| Number | Name | Date |
|---|---|---|
| 316,626 | Jackson | Apr. 28, 1885 |
| 395,387 | Ford | Jan. 1, 1889 |
| 2,259,809 | Freeman | Oct. 21, 1941 |